3,258,431
CATALYSTS AND THEIR USE
Arnold Fisher, John Frederick Ford, and John Carruthers, all of Sunbury-on-Thames, Middlesex, England, assignors to The British Petroleum Company Limited, London, England, a British joint-stock corporation
No Drawing. Filed Dec. 10, 1963, Ser. No. 329,360
Claims priority, application Great Britain, Dec. 12, 1962, 46,903/62
7 Claims. (Cl. 252—457)

This invention relates to catalysts comprising nickel or a nickel compound supported on a sepiolite base and their use for the hydrogenation of organic compounds.

U.K. Patent No. 899,652 discloses a catalyst comprising nickel or a nickel compound supported on a base consisting essentially of sepiolite and its use for the hydrogenation of organic compounds, particularly for reducing the gum-forming tendency of a gasoline containing di-olefins and/or styrenes. The use of a sepiolite base is particularly beneficial in that it has a low activity for undesirable side-reactions such as cracking and ploymerisation, but it has been recently found that it is not completely inactive. This is indicated for example by the fact that it shows a significant olefin isomerisation activity at moderate temperatures.

The present invention is concerned with further reducing the activity of the sepiolite and according to the present invention a catalyst comprises nickel or a nickel compound, a base consisting essentially of sepiolite and at least 0.1% wt. by weight of sepiolite of an added alkali metal or alkaline earth metal.

Sepiolite is a commercially available clay mineral, which occurs naturally and which can also be prepared synthetically. It has the ideal formula

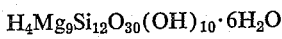

$$H_4Mg_9Si_{12}O_{30}(OH)_{10} \cdot 6H_2O$$

and is also known as meerschaum.

Preferably the amount of alkali metal or alkaline earth metal added is between 0.1% wt. and 5% wt. A convenient level of addition is 0.5% wt. However, commercially available sepiolites may already contain minor amounts of alkali metals (for example up to 1% wt.) and the total amount of alkali metal or alkaline earth metals will, therefore, clearly exceed such amounts. The total amount of alkali metal may thus be at least 1.1% wt., more particularly 1.1 to 6% wt.

Preferably the catalyst contains from 1 to 50% wt. of nickel (expressed as elemental nickel) by weight of total catalyst, and more particularly from 5 to 25% wt.

The catalyst may be prepared in any convenient manner and the present invention includes a method of preparing a catalyst comprising adding to a base material consisting essentially of sepiolite at least 0.1% wt. of an alkali metal or alkaline earth metal and also nickel, in either order. Preferably the alkali metal or alkaline earth metal is added before the nickel. The amounts of alkali metal or alkaline earth metal and nickel added may be as described above.

The use of the term "alkali metal or alkaline earth metal" includes, but is not limited to, the addition of these materials as metals. It is in fact preferred to add them as compounds. The compounds may be in the liquid or gaseous state, and a particularly preferred method is impregnation of the sepiolite using an aqueous solution of an alkali metal or alkaline earth metal compound.

Preferably the alkali metal or alkaline earth metal compound which is used in the formation of the catalyst is an ionic compound. Preferably this compound is a compound which is capable of providing metal cations under the conditions under which it is brought into contact with the sepiolite or under conditions employed subsequently.

Preferably the sepiolite is treated after the contacting to dissociate the alkali metal or alkaline earth metal compound, for example by calcination, and the compound used is preferably one which can be dissociated by heating without leaving other elements on the sepiolite. Particularly suitable compounds are hydroxides, carbonates, bicarbonates and the salts or organic acids, particularly carboxylic acids, for example formates, acetates and oxlates.

It may be desirable, prior to the addition of the alkali metal or alkaline earth metal to calcine the sepiolite to eliminate any moisture or other volatile material.

The nickel may be added in any convenient manner, again preferably in the form of a nickel compound. Thus the sepiolite may be impregnated with an aqueous solution of a nickel salt, for example nickel nitrate, and dried. On calcination the nickel nitrate is converted to nickel oxide and for certain uses, this may be a suitable active catalyst form. However, for the preferred uses given later, the active catalyst should contain predominantly metallic nickel and reduction of the nickel oxide to nickel may be accomplished by heating to 150° C. to 600° C. in a stream of hydrogen or hydrogen containing gas.

Preferably, when the active catalyst is required to contain metallic nickel, the nickel compound used is nickel formate. This may be added by milling dry nickel formate with the sepiolite or by dissolving nickel formate in ammonia and impregnating the sepiolite with the solution. The advantage of the use of nickel formate is that it reduces directly to nickel in a non-oxidising atmosphere, for example in an inert gas stream at a temperature of above 150° C. The upper limit is normally 300° C., but in the case of extruded catalysts it may be necessary to use higher temperature of up to 600° C.

The catalyst which is normally used in a fixed bed, may be in the form of granules, pellets or extrudates. Formation of the particles may be carried out at any convenient point of the preparation, but preferably, if possible, before the addition of the alkali metal or alkaline earth metal and the nickel.

The catalyst described above may be used in a process which also constitutes part of the invention, namely a process for the hydrogenation of organic compounds which comprises contacting the compounds, together with hydrogen, with a catalyst comprising nickel, present predominantly as metallic nickel, at least 0.1% wt. of an added alkali metal or alkaline earth metal, and a base consisting essentially of sepiolite under conditions of temperature and pressure which favour hydrogenation.

The process of this invention is suitable for use in the treatment of organic compounds containing carbon to carbon double bonds in the molecule for the saturation of these bonds. The process may also be employed for the treatment of organic compounds containing a carbon to carbon triple bonds in the molecule for the conversion of these bonds to carbon to carbon double bonds or for the saturation of the bonds. Also the process may be employed for the conversion of aromatic compounds to naphthenic compounds. Preferred feedstocks are hydrocarbons, or petroleum fractions, or materials consisting largely of hydrocarbons produced from petroleum by a process or treatment.

The process is of particular value for the conversion of di-olefinic compounds to mono-olefinic compounds. It has been found that under suitable reaction conditions, di-olefinic compounds may be converted to mono-olefinic compounds with only low conversion of these or other mono-olefinic compounds to saturated compounds.

The catalyst is particularly suitable for the partial hydrogenation of gasolines obtained by the thermal cracking of petroleum hydrocarbons, for example straight run naphthas, at temperatures above 460° C. The upper limit of temperature is usually 760° C. but it may be as high as 900° C. When the cracking is carried out to obtain olefins the process is operated at temperatures above 593° C. to 900° C. Such high temperature processes are usually carried out in the presence of steam, in which case they are conventionally referred to as steam cracking. Heating in such processes may either be direct or achieved through the use of a solid inert heat transfer agent, such as sand. In the latter case the cracking is frequently referred to as sand cracking. The principal products are normally gaseous unsaturated hydrocarbons, but some gasoline is also produced, which is highly unsaturated and tends to form gum, possibly due to the presence of styrene, cyclopentadiene and other conjugated dienes. The gasoline usually also contains from 0.005 to 0.04% wt. of sulphur, but, because of the high temperature of the cracking, substantially all this sulphur is contained in thiophene rings.

The process conditions for the hydrogenation processes, including the preferred partial hydrogenation of high-temperature thermally cracked gasolines may be chosen from the following ranges:

Temperature _____ 0 to 200° C., preferably 80 to 180° C.
Pressure _____ 0 to 1000 p.s.i.g., preferably 200 to 500 p.s.i.g.
Space velocity _____ 0.5 to 10 LHSV, preferably 1 to 5 LHSV.
Hydrogen treating rate (recycle or once through) __ 50 to 2000 s.c.f./b., preferably 100 to 1000 s.c.f./b.

The hydrogen used need not necessarily be pure hydrogen and mixtures of hydrogen with inert constituents may be used, preferably mixtures with a major amount of hydrogen.

For example, the excess gas from a reformer may be used and this normally contains from 50–80 mol percent hydrogen and from 50–20 mol percent of $C_1$–$C_4$ paraffin hydrocarbons. Other suitable gases may be steam cracker tail gas or catalytic cracker tail gas.

The hydrogen consumption will depend on the particular feedstock used and the extent of the hydrogenation required. With the preferred high temperature thermally cracked gasoline feedstocks the partial hydrogenation may have one of two objectives. If the hydrogenated product is intended as a gasoline blending blending component for use in internal combustion engines the hydrogenation should be limited to obtaining the required improvement in gum-forming tendency of the gasoline. In these circumstances the hydrogen consumption is usually at least 60 s.c.f./b. and more particularly at least 120 s.c.f./b., and it may be more than 150 s.c.f./b. The upper limit of hydrogen consumption will be determined by the undesirability of substantially reducing the octane number of the gasoline by hydrogenation of mono-olefins and/or aromatics. In practice a hydrogen consumption of less than 250 s.c.f./b. should be suitable. Preferably the research octane number (with 1.5 ml. TEL/IG) of the gasoline product is not more than one octane number below the research octane number of the similarly leaded feedstock. Leaded research octane numbers are preferred as a basis for comparison since while there may be some slight drop in research octane numbers (clear) as between feed and product, this is offset by an increased lead response in the product.

The characteristics of an acceptable commercial gasoline are determined in the long run by its behaviour in use. However certain tests can be used to give an indication of the behaviour of a gasoline in an engine or during storage and these include:

ASTM method D873–57T entitled Oxidation Stability of Aviation Fuels (Potential Residue Method) also referred to as the Accelerated Gum test, ASTM method D525–55 entitled Oxidation Stability of Gasoline (Induction Period Method), and the Lauson test which is described in the Petroleum Engineer, vol. 27 at pages C19–C30 (November 1955).

As a guide when using these tests, the product should, preferably have an accelerated gum figure of not greater than 5 mg./100 ml., an Induction period of not less than 240 minutes and preferably not less than 360 minutes, and an aged Lauson rating of not more than 100 mg./3.25 U.S. gallons.

If the objective is to extract aromatics from the gasoline then the partial hydrogenation should aim at reducing the diene index to a low level, for example less than 0.1. This will normally require a higher hydrogen consumption of at least 200 s.c.f./b. and it may be as high as 400 s.c.f./b. The hydrogenated gasoline of low diene index may then be further hydrogenated to produce a substantially saturated gasoline with a reduced risk of the formation of polymeric or carbonaceous deposits, using, preferably, a less selective and regenerable catalyst such as cobalt and molybdenum oxides on alumina. The saturated gasoline is then in a suitable form for a solvent treatment to extract the aromatics.

The hydrogen consumption for any given feedstock and process may be determined by experiment. Measurement of the hydrogen consumption may be readily made by metering and, if necessary, continuously analysing the gas entering and leaving the plant. As is well known in the art, hydrogen consumption can be increased, or maintained in the face of catalyst deactivation, by raising the hydrogen partial pressure, increasing the hydrogen/feedstock ratio, decreasing the feedstock flow rate, or increasing the temperature. The last-mentioned method is usually the most convenient in practice.

In partial hydrogenation processes, it has been previously found that, although the nickel is predominantly metallic nickel, selectivity is conferred by a limited uptake of sulphur. With the preferred high temperature thermally cracked gasolines, the presence of thiophenic sulphur in the feedstock confers the required selectivity. However, if a sulphur free feedstock is used or, if a selective catalyst is required from the start, the catalyst may be pre-treated as described in the complete specification of cognate U.K. Patent No. 972,245.

The invention is illustrated by the following example.

EXAMPLE (A) *Treatment of sepiolite*

¼–8 mesh granular commercially-available sepiolite was calcined at 550° C. for 2 hours and after cooling, it was treated with an aqueous solution of 0.3 N sodium bicarbonate for 72 hours. After this period the granules were washed with water and then dried at 110° C. and finally calcined at 550° C. for 2 hours. The amount of sodium added in this way was 0.5% wt. by weight of the sepiolite.

(B) *Activity of sepiolite*

The fresh and sodium treated sepiolites were tested for catalytic activity. The test used was the olefin isomerisation activity using 4-methylpentene-1 as feedstock. Seeing that the preferred feedstocks for use in the process of the present invention contain appreciable quantities of mono-olefins which are not normally required to be converted this test gives a measure of the activity of sepiolite for promoting side-reactions.

Tests were carried out at two different sets of conditions. The results given in Table 1 below showed that the treated sepiolite is much less active than the fresh sepiolite.

TABLE I

| Operating Conditions: | | | | |
|---|---|---|---|---|
| Temperature °C. | 400 | | 190 | |
| Liquid hourly space velocity v./v./hr. | 1.0 | | 2.0 | |
| Catalyst | Fresh Sepiolite | NaHCO₃ Treated Sepiolite | Fresh Sepiolite | NaHCO₃ Treated Sepiolite |
| Composition of Product: | | | | |
| Unchanged Feed percent wt. | 6 | 88 | 60 | 100 |
| Cis and trans 4-Methylpentene-2 percent wt. | 20 | 6 | 31 | 0 |
| 2-Methylpentene-1 do | 16 | 2 | 3 | 0 |
| 2-Methylpentene-2 do | 34 | 4 | 6 | 0 |
| Cis and trans 3-Methylpentene-2 percent wt. | 22 | 0 | 0 | 0 |
| 2:3-Dimethylbutene-2 do | 2 | 0 | 0 | 0 |
| Lower Hydrocarbons do | 0 | 0 | 0 | 0 |

(C) *Preparation of nickel catalysts*

The sodium treated sepiolite was impregnated with an ammoniacal solution of nickel formate over a period of 2 hours. The catalyst was dried at 110° C. for about 12 hours, and activated by heating in hydrogen at 250° C. for 4 hours.

A nickel catalyst on fresh sepiolite base was prepared by the same procedure.

The nickel content of each catalyst was 10 percent by weight.

(D) *Hydrogenation activity of nickel catalysts*

The nickel on fresh sepiolite and the nickel on sodium treated sepiolite catalyst were examined for hydrogenation activity by hydrotreating raw steam cracker gasoline under the following conditions:

Temperature _____ 100° C.
Pressure _____ 200 p.s.i.g.
Liquid hourly space velocity _____ 2.0 v./v./hr.
Once-through gas _____ Hydrogen.
Gas flow rate _____ 750 s.c.f./b.

The results given in Table 2 below show that treating the sepiolite base with sodium did not significantly affect the hydrogenation activity of the catalyst as measured by the hydrogen consumption.

| Catalyst | 10% Wt. Nickel on Fresh Sepiolite | 10% Wt. Nickel on NaHCO₃ Treated Sepiolite |
|---|---|---|
| Test Period HOS | 8-14 | 8-14 |
| Hydrogenation Activity s.c.f./b. | 328 | 317 |

The combinaion of test (B) and (D) indicates that the sodium treated catalyst has a lower activity for side-reactions but a similar hydrogenation activity.

We claim:

1. A catalyst suitable for the hydrogenation of organic compounds at temperatures of from 0 to 200° C. comprising a nickel-containing hydrogenating component selected from the group consisting of nickel and nickel compound, the nickel content, expressed as elemental nickel, of said hydrogenating component constituting from 1 to 50% weight by weight of the total catalyst, a base consisting essentially of sepiolite and from 0.1 to 5% weight by weight of sepiolite of an added alkali metal.

2. A catalyst as claimed in claim 1, wherein the amount of nickel is from 5 to 25% wt.

3. A method of preparing a catalyst suitable for the hydrogenation of organic compounds at temperature of from 0 to 200° C., comprising adding to a base material consisting essentially of sepiolite from 0.1 to 5% weight of an alkali metal and also a nickel-containing hydrogenating compontent selected from the group consisting of nickel and nickel compound, the nickel content, expressed as elemental nickel, of said hydrogenating component constituting from 1 to 50% weight by weight of total catalyst.

4. A method as claimed in claim 3 wherein the amount of nickel is from 5 to 25% wt.

5. A method as claimed in claim 3 wherein the alkali metal is added before the nickel-containing hydrogenating component.

6. A method as claimed in claim 3 wherein the alkali metal is added as a compound which can be dissociated by heating without leaving other elements on the sepiolite.

7. A method as claimed in claim 6 wherein the alkali metal compound is a compound selected from the group consisting of the alkali metal hydroxides, alkali metal carbonates, alkali metal bicarbonates and alkali metal salts of organic acids.

References Cited by the Examiner

UNITED STATES PATENTS 2,773,011   12/1956   Haensel _____ 208—217
3,004,914   10/1961   White _____ 208—255
3,113,096   12/1963   White _____ 208—255
3,116,233   12/1963   Dovwes et al. _____ 208—255

DELBERT E. GANTZ, *Primary Examiner.*

S. P. JONES, *Assistant Examiner.*